Figures 1, 2, 3:
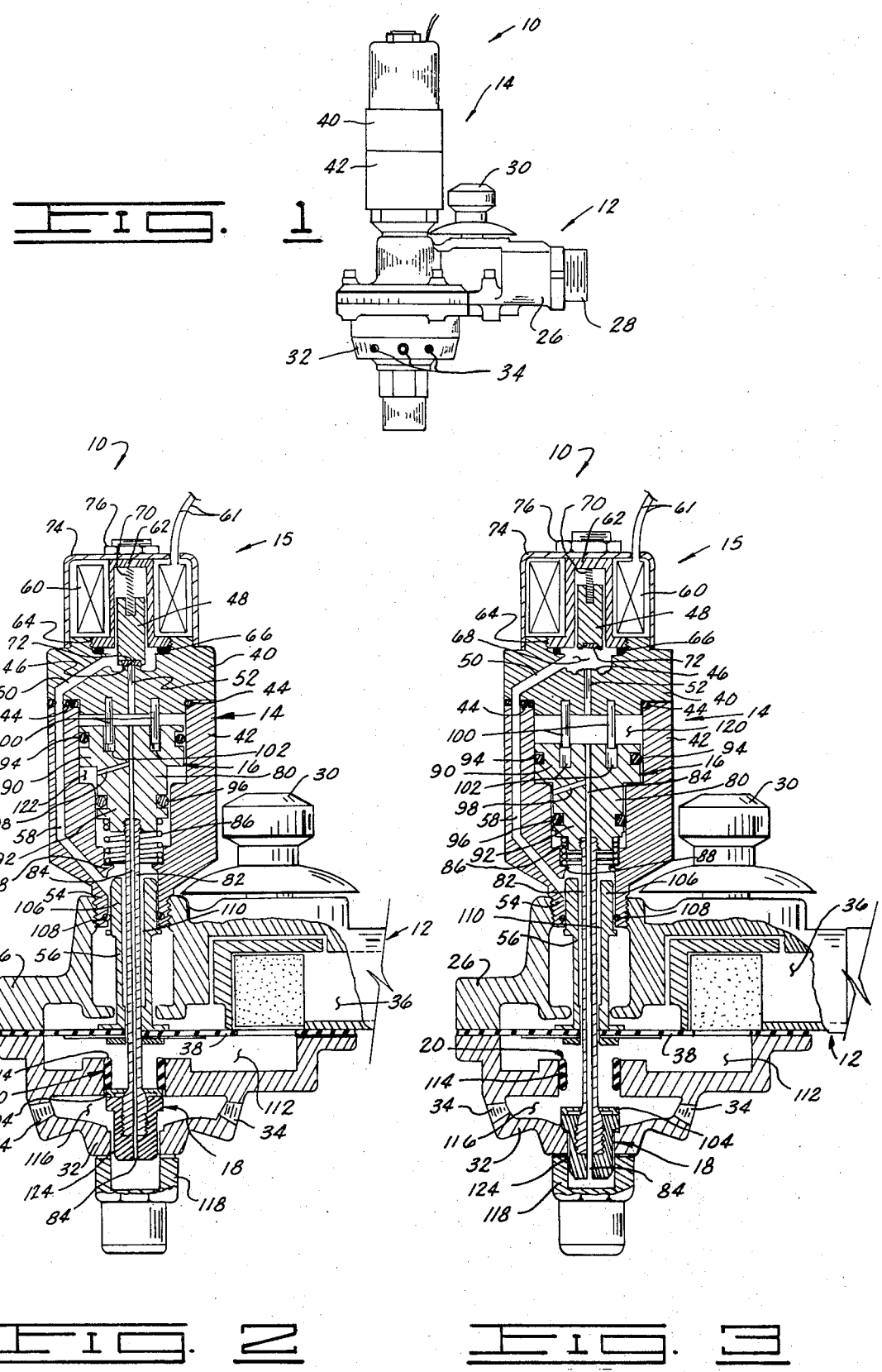

United States Patent [19]
Holmes et al.

[11] 3,801,063
[45] Apr. 2, 1974

[54] SOLENOID ACTUATED VALVE FOR ANHYDROUS AMMONIA FLOW METERS

[76] Inventors: John E. Holmes; Eugene B. Berning, both of P.O. Box 1111, both of Garden City, Kans. 67846

[22] Filed: July 31, 1972

[21] Appl. No.: 276,526

Related U.S. Application Data

[63] Continuation-in-part of Ser. No. 109,328, Jan. 25, 1971, Pat. No. 3,698,682.

[52] U.S. Cl. .................................. 251/30, 251/33
[51] Int. Cl. ............................................ F16k 31/42
[58] Field of Search ................................ 251/33, 30

[56] References Cited
UNITED STATES PATENTS
2,129,938   9/1938   Johnson ........................... 251/33 X
2,398,775   4/1946   Beekley et al. ................... 251/33 X Primary Examiner—Arnold Rosenthal
Attorney, Agent, or Firm—John H. Widdowson

[57] ABSTRACT

A solenoid actuated valve operator is used for controlling flow of a normally gaseous fluid in a conduit. A valve operator housing is mountable with the conduit which has an internal valve seat. A solenoid mounts within the housing. A plunger extends from the housing and receives fluid pressure. The plunger has a valve closer on the extended end thereof. A passageway through the plunger communicates between the solenoid and the conduit. The core of the solenoid operates to open and close the passageway. Another passageway connects the solenoid assembly and the outside of the housing. The plunger is urged to a retracted position by a resiliently applied force. A solenoid actuated valve operator when mounted contacts the conduit valve seat with a valve closer. With the core member disengaged liquid fluid pressure exerts a force on the plunger overcoming the resilient force to extend the plunger and open the conduit.

6 Claims, 3 Drawing Figures

3,801,063

SOLENOID ACTUATED VALVE FOR ANHYDROUS AMMONIA FLOW METERS

This application for patent is a continuation-in-part of the application entitled SOLENOID ACTUATED VALVE FOR ANHYDROUS AMMONIA FLOW METERS, filed Jan. 25, 1971, having Ser. No. 109,328 now U.S. Pat. No. 3,698,682.

Numerous types of solenoid valves and solenoid operated valves are known in the prior art. However, not all these valves and valve operators are adapted for use in handling gaseous fluids, and in particular they are not adaptable for use with all conventional anhydrous ammonia flow meters. Technically, anhydrous ammonia is stored in a reservoir in a liquid fluid condition and the anhydrous ammonia flow meter is used to regulate the amount of liquid fluid to pass from the reservoir and has means to expand the liquid fluid into a gaseous fluid as it passes through the flow meter. Conventionally, anhydrous ammonia flow meters have a valve seat contained therein and a valve sealing member mated thereto which is actuated by a mechanical valve operator. Within the anhydrous ammonia flow meter the main valve has one of two basic configurations: (1), the valve sealing member is on one side of the valve seat and is normally in contact with the valve seat and is raised upward when opened, or (2), the valve sealing member is mounted on a plunger extending through the valve seat and normally in contact with the valve seat portion of the flow meter and is moved downward away from the valve seat when opened. In the prior identified patent application a device described, depicted and claimed therein is adapted for use with the first, (1), flow meter configuration to raise the valve sealing member from the valve seat portion of the flow meter when the valve operator is actuated. The herein described invention is basically similar to the invention disclosed in the prior identified application for patent but is constructed differently so as to be used with the second, (2), flow meter configuration. The herein described solenoid actuated valve operator of this invention is an improvement over the prior identified patent application, the improvement lying in the structural configuration of the device and its adaptation for use with anhydrous ammonia flow meters wherein the valve sealing member must be moved away from the valve seat by a meter extending through the valve seat aperture.

The disadvantage in the prior art mechanical valve operators used with anhydrous ammonia flow meters of the type on which this invention is to be used is that they require the use of a lanyard or the like to connect the mechanical valve to the person operating it and that they stick in operation. Normally, anhydrous ammonia flow meters are used on agricultural fertilizing equipment wherein a large ammonia tank is connected to an ammonia drill which is pulled by a tractor. The anhydrous ammonia flow meter is mounted on the tank and operated by the drive of the tractor. With the conventional mechanically operable valves a lanyard must be connected between the flow meter operator and a tractor so the tractor can pull the lanyard and open and close the valve. If the lanyard should break during the ammoniating process, the tractor driver would have no means to shut off the flow without physically going to it to do so. Due to the poisonous nature of ammonia gas, it is dangerous for the operator of the tractor to approach the equipment without special breathing equipment. The mechanical valve operators are designed and constructed to be set in the open position and closed by pulling the lanyard. These valves have a tendency to stick in the open position but not be closable in the normal manner. If for some reason the ammoniating apparatus should need attention while ammonia is flowing from the tank and the valve operator is not positively shut off, it is dangerous for a person to approach it due to the poisonous nature of anhydrous ammonia gas. Often times when the apparatus needs attention and the ammonia flow cannot be shut off, the ammonia in the tank will be lost by escaping into the atmosphere creating a great danger and at a great expense.

In one preferred specific embodiment of this invention, an improved solenoid actuated valve operator for use with anhydrous ammonia flow meters is provided which includes a resiliently urged piston-plunger with a valve closing member attached thereto normally engaged with the main valve seat of an anhydrous ammonia flow meter having a remotely operable solenoid assembly and adapted to move the valve closing member away from the valve seat by moving the piston-plunger through the valve seat aperture. The solenoid actuated valve operator includes a housing containing the piston portion of the movable piston-plunger assembly with the solenoid assembly on the top thereof. It also has an extended plunger with the valve closing member on the end thereof extending from the housing and through the control valve seat aperture in the housing with the valve closing member adapted to engage a control valve seat inside the flow meter on the side opposite the housing and solenoid assembly. The housing is mounted with the anhydrous ammonia flow meter structure. The valve closing member is contactable with the main valve seat inside of the flow meter in a normally closed position. A system of apertures and passageways connect the exterior of the plunger with the solenoid assembly; a core of the electrically operated solenoid assembly is positioned in the system of passageways so as to function as a valve controlling the fluid flow therethrough. The system of apertures and passageways permits flow of the gaseous fluid through the housing so as to exert pressure on and move the piston-plunger assembly to open the valve. The movable piston-plunger assembly is resiliently urged to a retracted position to hold the valve closing member in the normally closed position. The normally closed condition of the main valve provides for a positive flow stopping feature should the valve operator fail.

One object of this invention is to provide a solenoid actuated valve operator to be used in controlling normally gaseous fluids and overcoming the aforementioned disadvantages of the prior art devices.

Still, one other object of this invention is to provide a solenoid actuated valve operator for use in controlling normally gaseous fluids which is usable with conventional anhydrous ammonia flow meters and is remotely electrically operable to provide a positive on-off type flow control for an anhydrous ammonia flow meter.

Still, another object of this invention is to provide a solenoid actuated valve operator which is resiliently urged to a normally closed position and opened by utilizing operating pressure and fluid of the normally gaseous fluid which it is controlling.

Yet, an additional object of this invention is to provide a solenoid actuated valve operator with the housing containing a resiliently urged movable piston-plunger assembly, a system of apertures and passageways permitting flow through and around a piston-plunger assembly, such flow being controllable by a solenoid valve assembly and with the flow through the piston-plunger assembly functioning to force the piston-plunger assembly outward, thereby opening the valve.

Various other objects, advantages, and features of the invention will become apparent to those skilled in the art from the following discussion, taken in conjunction with the accompanying drawings, in which:

FIG. 1 is a side elevation view of the solenoid actuated valve operator mounted on an anhydrous ammonia flow meter;

FIG. 2 is an elevation view of the anhydrous ammonia flow meter shown in FIG. 1 having portions removed for clarity, showing the solenoid valve operator in cross-section and in the normally closed position; and FIG. 3 is an elevation view of the anhydrous ammonia flow meter as shown in FIG. 1 with portions removed for clarity showing the solenoid valve operator in cross-section and in the open position.

The following is a discussion and description of preferred specific embodiments of the improved solenoid actuated valve operator of this invention, such being made with reference to the drawings, whereupon the same reference numerals are used to indicate the same or similar parts and/or structure. It is to be understood that such discussion and description is not to unduly limit the scope of the invention.

Referring to the drawings in detail and in particular to FIG. 1, the improved solenoid actuated valve operator of this invention, generally indicated at 10, is shown mounted on an anhydrous ammonia flow meter, indicated at 12. The solenoid actuated valve operator of this invention includes a housing 14 mounted with the structure of the flow meter 12 and having a solenoid assembly 15 on the unattached end of the housing 14, a piston-plunger assembly 16 movably inside the housing and extending from the housing with a closing member 18 on the end portion thereof engagable with the main valve seat 20 inside the flow meter 12.

All anhydrous ammonia flow meters are basically similar in their construction and have a metering apparatus portion and an outlet manifold portion separated by a main valve assembly used to turn on and off fluid flow through the meter. The main valve assembly is the portion of the flow meter controlled by the solenoid actuated valve operator of this invention. The solenoid actuated valve operator of this invention is adapted for use with a flow meter by replacing the conventional mechanical operator for the main valve assembly. It is to be noted that the herein described improved solenoid actuated valve operator is shown and described with one particular make of anhydrous ammonia flow meter; however, it is to be understood that other makes of flow meters having the necessary structural similarities can be used with the valve operator of this invention. The anhydrous ammonia flow meter shown in the accompanying drawings is a product of Continental, Inc., of Dallas, Texas, sold under the name of METER MATIC. The solenoid actuated valve operator will operate on either the Model 6000 or 6500 flow meter of Continental, Inc. Also, it is to be noted that the improved solenoid actuated valve operator of this invention is not to be restricted in use only to anhydrous ammonia flow meters. The solenoid actuated valve operator of this invention will function and a fluid passageway having a valve seat such as necessary for the closing member to engage and will operate with normally gaseous fluids other than anhydrous ammonia. In the adaptation of the herein described valve operator for use with anything other than the METER MATIC flow meter shown in the drawings, some structural modification may be necessary to the housing of the operator and to the closing member to make the structures compatible, but the operation and basic structural components of the device remain the same as the device shown and described herein.

FIG. 1 shows the anhydrous ammonia flow meter, the METER MATIC, with the solenoid valve operator 10 mounted therewith. The flow meter 12 includes a housing 26, an inlet 28, a flow control adjustment knob 30 on its upper side, and an outlet manifold portion 32 on its lower portion with a plurality of outlets 34. The flow meter 12 when mounted is in an upright position as shown in FIG. 1. The inlet 28 to the flow meter is connected to a high pressure source of the gaseous fluid, and in the normal agricultural use, to a tank of anhydrous ammonia where the fluid is stored in a liquid stage. The interior of the flow meter 12 includes an inlet chamber indicated at 36, a diaphragm 38 between the high pressure and the lower pressure sides of the metering apparatus, a main valve seat 20 between the diaphragm area and the outlet manifold 32. FIG. 2 and FIG. 3 show the anhydrous ammonia flow meter 12 with the inlet to the flow meter removed. The main valve seat 20 is circular and mounted in the flow meter housing 26 adjacent to the outlet manifold cavity; all fluid passing through the flow meter passes through the main valve.

The housing 14 of the solenoid actuated valve operator 10 is constructed in two separable members: an upper member 40 mounting the solenoid assembly 15, and a lower member 42 containing the piston-plunger assembly 16 and attachable to the housing 26 of the anhydrous ammonia flow meter. The upper and lower members of the valve operator housing are connected by fasteners, not shown in the drawings, and are sealed at their junction by an O-ring indicated at 44. The upper housing member 40 has a valve seat 46 for the solenoid assembly slug 48 with an inlet passageway through the outer portion of the member to the valve seat area and an outlet passageway 52 in the center of the member from the valve seat 46. The lower housing member 42 has a threaded portion on its lower end portion 54 adatped to engage a similarly threaded portion on the flow meter housing 26 as shown in FIGS. 2 and 3. The interior of the lower housing member 42 has a cylindrically shaped cavity to receive the piston-plunger assembly 16. The interior of the lower housing member 42 is formed into two coaxial and diametrically different sized adjoining portions and has a third coaxial portion extending to the threaded end portion of the housing member adapted to receive a collar 56 extending from the diaphragm. Additionally, the lower housing member 42 has a passageway 58 in its outer portion connecting the lower and third-named portion of the interior cavity to the inlet 50 of the upper housing member 40.

The solenoid assembly 15 includes a solenoid coil 60 fitted around a plug member 62 that contains the solenoid slug 48 and is threadedly attached to the upper housing member 40. The plug member 62 is attached to the upper housing member 40 by threads indicated at 64 and is sealed by an O-ring 66. The interior of the plug 62 is cylindrical in size to slidably contain the solenoid slug 48. The solenoid valve seat area is indicated at 68 immediately below the lower portion of the plug member 62. The solenoid slug 48 has a spring 70 compressed between its upper end portion and the top of the cylindrical cavity of the plug adapted to force the solenoid slug downward into contact with the valve seat 46. A resilient seal 72 is provided in the lower end of the solenoid slug 48 so the solenoid slug can make an effective seal between the passageway 50 and 52 the valve seat 46 when in contact therewith. FIG. 2 shows the solenoid assembly in the normally closed position wherein no electrical force is acting on the solenoid slug and the spring 70 is holding the slug in place against the valve seat 46. FIG. 2 shows the solenoid assembly 15 in the open position wherein electromagnetic force from the solenoid coil 60 overcomes the force of the spring 70 and removes the solenoid slug 48 from the valve seat 46.

The solenoid coil 60 used in the solenoid assembly 15 is designed to be used with standard operating voltages common to agricultural equipment on which the valve operator 10 is to be used. The common operating voltages for tractors and like vehicles may be either 6, 12, or 24 volts; a coil can be used to operate with any of these voltages. The solenoid assembly 15 is provided with the cover 74 attached to the plug member 62 by a nut 76. The solenoid coil is preferably constructed in a cylindrical enclosure and can be removed from the plug by removing the nut 76 and cover 74. Preferably, the solenoid coil 60 is fitted with electrical wires 61 extending through the cover 74 to allow for connection with the electrical system of the operating vehicle or the whatever.

The piston-plunger assembly 16 includes a piston 80 with two portions of different diameters, the smaller portion attached to an elongated plunger 82 having an axially oriented aperture 84 through the piston 80, a plunger 82 extending from the piston 80, and a piston spring 86 acting in compression between the smaller portion of the piston and the lower housing member 42. The piston-plunger assembly 16 is contained in the cylindrical portion of the lower housing member 42 with the elongated plunger 82 extending from the housing through the main flow meter valve 20 and having the closing member 18 attached to its outer end. The piston spring 86 is contained in the cylindrical cavity as shown in the drawings between the end of the cavity 88 and the smaller end of the piston 80. The spring 86 provides the resilient force necessary to hold the closing member 18 in contact with the main valve seat 20 as shown in the normally closed position, FIG. 2. The piston 80 has a large diameter portion 90 and small diameter portion 92 both cylindrical around the same axis and having the aperture 84 along that axis. O-ring type seals are provided at the outer portions of the piston as indicated by the groove and seals 94 and 96, respectively, at the larger and smaller portions of the piston. A vent aperture 98 connects the main aperture 84 on the outer wall of the piston at the smaller portion 96 to allow for venting of the cylinder so the piston will move properly. A pair of guide pins 100 are permanently fixed in the upper housing member 40 and extend downward into apertures 102 in the large diameter portion 90 of the piston 80. These guide pins are provided to prevent rotation of the piston, such being necessary to provide unscrewing of the threadedly attached plunger 82 and/or the threadedly attached closing member 18.

On the lower portion of the piston-plunger assembly 16 the helical piston spring 86 is fitted on a portion of the lower piston in order to maintain same in a coaxial relation with the piston 80. A resilient seal 104 is attached to the upper surface of the closing member 18 to insure a positive seal with the valve seat 20 in the flow meter housing 26. The collar 56 is supported on the diaphragm 38; it has an upper portion 106 extending into the lower end of the housing 54 and is sealed on its outer upper portion by an O-ring type seal 108. The interior of the collar is sized so as to form a passageway 110 between the plunger 82 and the collar. The plunger 82 is not restricted in its movement passing through the collar 56. The collar 56 provides a passageway 110 communicating between the lower end of the piston cylinder and the housing chamber 112 below the diaphragm 38.

Within the flow meter housing 26 the valve seat 20 is fitted between the lower diaphragm chamber 112 and the outlet manifold 32. The valve seat 20 has a removable and replaceable seat member 114 which is engaged by the resilient seal 104 on the closing member 18. The diaphragm 38 is held in place between the upper and lower portions of the flow meter housing as shown in the drawings with the collar 56 secured to it in alignment with the plunger 82. The diaphragm 38 and collar 56 are original members of the flow meter 12 and are necessary components in its operation. The aperture 84 extends completely through the plunger 32 and through the lower end of the closing member 18 communicating into the outlet manifold cavity 116. The closing member 18 moves into the cylindrical and extended portion of the flow meter housing 118 and is sized sufficiently to allow continual communication between the end of the aperture 84 and the outlet manifold cavity 116 even when it is in the open position as shown in FIG. 3.

When installed and ready for conventional agricultural fertilizing use, the anhydrous ammonia flow meter 12 has the inlet 28 connected to a high pressure large volume reservoir of liquid anhydrous ammonia and the outlets 34 connected to an ammonia drill or similar ammonia dispensing device. In the normal agricultural use of the anhydrous ammonia flow meter 12 it is mounted on a tank trailer, and the outlets 34 are connected by hoses to an ammonia drill implement attached to or pulled behind the trailer. FIG. 2 shows the piston of the flow meter 12 and valve operator 10 in the normally closed position assumed by the apparatus during periods of nonuse.

When in the nonuse or closed position, certain portions of the flow meter and valve operator are at atmospheric pressure and other portions are at higher pressures. At such time, atmospheric pressure conditions exist in the ammonia drill connecting tubes, the outlet manifold cavity 116, the aperture 84 through the plunger 82 and piston 80, in the vent aperture 98, in the space between the large portion of the piston 90 and the smaller portion 92, in the space above the large portion 90 of the piston, and in the connecting aperture 52 in the upper housing member 40. Also, at such time higher then atmospheric pressure conditions exist in the inlet chamber to the flow meter indicated at 36, the cavity enclosing the diaphragm 38, the portion below the diaphragm 112, the space between the plunger 82 and the collar 56, the portion of the piston cylinder below the lower piston seal 96, in the passageway 58 in the lower housing member 52, in the passageway in the upper housing member 40, and in the cavity of the plug 62 surrounding the solenoid slug 48. In this closed position the valve seat 46 in the upper member 40 and the resilient portion 72 of the solenoid slug cooperate to form a seal between the passageways 50 and 52 separating the differential pressures. The spring 70 above the solenoid slug 48 holds the resilient portion thereof 72 in contact with the solenoid valve seat 46. FIG. 3 shows the valve operator 10 in the open position and the main valve assembly 20 inside the flow meter 12 in the open position.

FIG. 3 shows the apparatus in the open position. When in the open position, the solenoid slug 48 is raised above the valve seat 46; the piston 80 is in the lowered position as shown; the piston spring 88 is compressed below the piston; the valve closing member 18 is below the valve seat 114 of the main valve assembly 20; and the fluid pressure in the outlet manifold cavity 116 is at the normal operating pressure for the flow meter. Pressure through the outlet manifold 32 is the nominal discharge pressure and is adjustable and varied by apparatus of the flow meter. The exact pressure is not relevant to the operation of the valve operator 10; however, such pressure must be sufficient to overcome the resilient piston spring force to open the main valve once the solenoid is actuated.

At such time as the solenoid assembly 25 is actuated and the coil 60 is energized, the solenoid slug 48 moves upward against the force of the spring 70, thereby removing the resilient seal portion of the solenoid slug 72 from the valve seat 46 and allowing communication between the passageways 50 and 52 in the upper housing member 40. When the communication is open between the passageways 50 and 52, the high pressure in passageway 50 causes the fluid in that passageway and the connecting passageways to move fluid through the passageway 52 and into the cavity 120 on top of the piston 80, through the aperture 84 in the plunger 82 out through the end of the aperture in the closing member 18. When this pressure increase takes place, the piston 80 is forced downward against the resisting force of the lower spring 86 by pressure on the upper surface of the large piston portion 90. At such time as the piston moves downward, fluid is trapped in the annular space between the piston cylinder wall and the piston immediately below the enlarged piston portion 90; the annular space is indicated at 122 in FIG. 2; such is forced through the passageway 98 into the aperture 84 and thereby vented into the rest of the fluid system.

When the valve operator is in the open position, the same pressure exists on the upper and lower surfaces of the piston 80; the force necessary to overcome the resilient force of the spring is produced by the combination of the pressure on the piston larger upper surface and the fluid flow through the pisgon and plunger assembly 16. The apertures through the piston and plunger assembly 16 and through the valve opertor housing 14 are constructed and designed so that fluid flow through the piston-plunger assembly 16 will be such that pressure is maintained in the cavity 120 above the piston 80 sufficient to overcome the resisting force of the spring 86 and maintain the valve operator 10 in the open position as fluid flows through the valve operator in the normal open position. The normal position of the valve operator 10 includes a fluid flow through the valve operator in order to maintain the open position. The fluid flow is as follows: upward through the space 110 between the plunger 84 and the collar 56, through the housing aperture 58 in its lower member 42, through the passageways 50 and 52 in the upper housing member 40, through the cavity 120 above the piston 80, through the aperture 84 in the position and plunger assembly, through the space 124 between the closing member 18 and the outlet manifold cover 118, and through the outlet manifold 32 into the outlet manifold cavity 116. When the piston-plunger assembly moves into the open position, the guide pins 100 slide in the piston apertures 102 thereby preventing rotation of the piston and inadvertent unscrewing of the plunger 82 from the piston 80 and unscrewing of the valve closing member 18 from the lower end of the plunger 82. These guide pins 100 are preferably constructed of stainless steel and sized relative to the apertures 102 to move freely so as not to restrict or hinder movement of the piston-plunger assembly 16. Additionally, when the valve operator 10 opens the main valve 20, the diaphragm 38 and other components of the flow meter 12 necessary for its operation move to their normal operating positions. However, such is not relevant to the actual operation of the valve operator of the herein described invention.

Closing of the main valve 20 by the valve operator 10 is accomplished by terminating the electrical supply to the solenoid coil 60; at such time the solenoid slug 48 moves into closed position on the valve seat 46 as shown in FIG. 2, and the fluid flow through the valve operator is stopped. Once the fluid flow through the valve operator has been terminated, the force of the spring 86 will no longer be overcome by pressure in the cavity 120 above the piston 80, and the spring 86 will force the piston 80 upward from the position shown in FIG. 3 toward the position shown in FIG. 2. As the piston-plunger assembly 16 moves upward, the annular passageway 122 below the enlarged upper portion 90 of the piston between it and the cylinder wall will again be increased and will be filled with the fluid through the passageway 98 from fluid in the cavity 120 and in the aperture 84. It is to be noted that if the annular segment 122 was not vented the piston 80 would be unable to move downward due to compressing fluid in that passageway and would be unable to move upward due to low pressure created in that area due to the enlarging space. The fluid enclosed in the extended portion of the plunger 82 continues to pass through it, around the end closure member 18 and into the outlet manifold cavity 116 as the closure member 18 is moved into the closed position. When the piston-plunger assembly 16 has returned to the closed position, the pressure in the outlet manifold cavity 116, the aperture and its connected passageways, etc., has substantially returned to the atmospheric pressure while the pressure on the other side of the solenoid valve in the upper housing member 40 is at the operating pressure for the flow meter.

An important safety feature of the herein described solenoid actuated valve operator 19 is related to its automatic closing features. At any time when the electrical power supplied to the solenoid coil is terminated for a significant period of time, the solenoid slug 48 will fall in place on the valve seat 46 and cause the main valve in the flow meter 12 to be closed thereby discontinuing the gaseous fluid flow through the flow meter. Additionally, the solenoid actuated valve operator 10 provides a means of positively closing the flow meter's main valve; that is, the normal position of the valve operator is the closed position, and it will assume this position when the electrical supply is terminated or if the passageways of the valve operator become plugged, or additionally if the operating of the flow meter is so low the valve operator will not properly operate. Another inherent feature of the solenoid actuated valve operator 10 is its positive opening feature; that is, the valve operator will not open unless electrical power is supplied to the solenoid assembly 15; and, furthermore, it will not open unless the operating pressure of the flow meter is sufficiently high to overcome the resisting force of the piston spring 86.

In the manufacture of the improved solenoid actuated valve operator 10 of this invention, it is obvious tha the components thereof can be constructed of material which is resistive to the corrosive effects of the gasesous fluid which it is to control. In the preferred use of the solenoid actuated valve operator 10 of this invention, the valve operator housing and other components thereof are preferably constructed of aluminum, stainless steel, and neoprene which in practice have been found to perform well and to resist corrosive effects of the anhydrous ammonia and to operate in the reduced temperature environment encountered with the expanding gaseous fluid as it passes through the flow meter.

In the use of the improved solenoid actuated valve operator of this invention, it is seen that same provides a valve operator structure adapted for use with a type of conventional anhydrous ammonia flow meters. The solenoid actuated valve operator 10 has safety features inherently associated with its valve operator 10 has safety features inherently assocaited with its electrically operated solenoid and positive means of opening and closing the main valve of the anhydrous ammonia flow meter.

As will be apparent from the foregoing description of the improved solenoid actuated valve operator of this invention, relatively simple means have been provided to control the main valve of an anhydrous ammonia flow meter, and means which can be adapted to the controlling of gaseous fluid flow in other devices. The solenoid actuated valve operator is easily attached to a conduit and a conventional type anhydrous ammonia flow meter wherein the valve operator is on the opposite side of the valve seat from the valve closing member to provide a safe and positive means of starting and stopping the flow of a gaseous fluid.

While the invention has been described in conjunction with the preferred specific embodiments thereof, it will be understood that this description is intended to illustrate and not limit the scope of the invention, which is defined by the following claims.

We claim:

1. In a solenoid actuated valve operator means for controlling the flow of a normally gaseous fluid from a liquid supply of same, having, a valve operator housing having a first passageway communicating with said liquid supply, a solenoid means mounted with said housing and having a core member, movable means having means therewith to receive fluid pressure thereon mounted within said housing, said movable means having a portion extending from said housing and including an outer end portion, said movable means having a second passageway therethrough communicating with said solenoid means, and said movable means having a valve closing member mounted on the outer end portion of said extended portion, and said first passageway within said housing communicates with said solenoid means, that improvement comprising:

a partition member having a third passageway communicating with said second passageway and situated within said housing separating said solenoid means and said movable means, said partition member including at least one guide pin means attached thereto and extending therefrom, said movable means includes at least one groove wherein said guide pin means slidably lodges to keep said movable means from turning, said core member operably closes and/or opens said third passageway, a resilient means mounted between said movable means and said housing and urging said movable means into retracted closed position, said solenoid actuated valve operator means constructed and adapted to be mounted on a conduit having a valve seat therein, and when so mounted said valve closing means contactable with said valve seat, and in operation with said core member closing said third and said second passageway, said resilient means retracting said closing member to closed position with the valve seat, and with said core member not closing said third and said second passageway, and force exerted on said fluid pressure receiving means on said movable means by pressure from the fluid in liquid form exerted thereon overcoming said resilient means to extend said movable means and move said valve closing means to open position.

2. The valve operator means of claim 1, wherein:
a. said movable means is a slidably mounted plunger, and said means therewith to receive fluid pressure in a piston, and
b. said resilient means is a spring mounted around said plunger between said housing and said plunger, said spring acting in compression.

3. In a solenoid actuated valve means for controlling the flow of a normally gaseous fluid from a liquid supply of same, having, a valve operator housing, a solenoid means having an inner chamber closed to the atmosphere, and an axially movable core member mounted in said chamber, said solenoid means mounted with said housing, a chamber with said housing having one portion larger than another portion, a first passageway through said housing having an outer end portion and communicating between said larger end portion of said chamber within said housing and said solenoid chamber, the outer end portion of said first passageway having a valve seat receiving in operation said core member, a second passageway through said housing communicating between said other portion of said chamber and said solenoid chamber, a piston-plunger means having a small plunger portion and a large plunger portion mounted in said chamber within said housing, the smaller plunger portion extending from said housing and forming with said housing an annular passageway communicating between the outside of said housing and said second passageway within said housing, sealing means between an outer end portion of said plunger portion and said housing, a piston mounted in said chamber within said housing, a main passageway through said plunger portion communicating between said first passageway through said housing and outside said plunger portion, a main passageway through said piston, and a second passageway through said piston between said main passageway and said chamber at the wall thereof between the ends thereof, and a valve closing member mounted on the outer end portion of said extended inner plunger portion, that improvement comprising:

resilient means mounted between said movable means and said housing and urging said piston-plunger means into retracted closed position, said piston has a guide pin means between said piston and said housing to keep said piston from turning, said solenoid actuated valve operator means constructed and adapted to be mounted on a conduit having a valve seat therein, and when so mounted said valve closing means contactable with said valve seat, and in operation with said core member closing said first passageway in said housing, said resilient means retracting said valve closing means to closed position with the valve seat, and with said solenoid actuated to retract said core member and open said first passageway in said housing, the force exerted on said piston by the pressure from the fluid in liquid form exerted thereon overcoming the force of said resilient means to extend said plunger portion and move said valve closing means to an open position relative the valve seat.

4. The valve operator means of claim 3, wherein:
a. said first passageway through said housing and said main passageway through said plunger portion is a gaseous fluid passageway,
b. said second passageway through said housing, said annular passageway and said passageways through said piston are liquid fluid passageways, and
c. said resilient means is a helical spring mounted between said housing and said piston and around said plunger, said spring acting in compression.

5. The solenoid actuated valve operator as described in claim 4, wherein:
a. said lower housing portion is threaded on the outer end portion thereof adapted to threadedly attach an anhydrous ammonia flow meter.

6. The solenoid actuated valve operator as described in claim 5, wherein:
a. said lower housing portion has a flanged portion on the lower end thereof adapted to attach said solenoid valve to said anhydrous ammonia flow meter.

* * * * *